United States Patent
Hunt et al.

(10) Patent No.: US 7,834,764 B2
(45) Date of Patent: *Nov. 16, 2010

(54) PREFETCHING MANIFEST DATA IN AN RFID SYSTEM

(75) Inventors: Christian Lee Hunt, Cary, NC (US); Gregory Covert Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/169,748

(22) Filed: Jul. 9, 2008

(65) Prior Publication Data

US 2008/0266062 A1  Oct. 30, 2008

Related U.S. Application Data

(63) Continuation of application No. 11/244,362, filed on Oct. 5, 2005, now Pat. No. 7,432,797.

(51) Int. Cl.
*G08B 13/00* (2006.01)

(52) U.S. Cl. ............... 340/572.1; 340/572.8; 340/10.1; 340/10.5

(58) Field of Classification Search ............... 340/572, 340/10, 505
See application file for complete search history.

(56) References Cited

U.S. PATENT DOCUMENTS

| | | | |
|---|---|---|---|
| 6,232,870 B1 | 5/2001 | Garber et al. | |
| 6,509,828 B2 | 1/2003 | Bolavage et al. | |
| 6,801,833 B2 * | 10/2004 | Pintsov et al. | 700/223 |
| 6,825,766 B2 * | 11/2004 | Hewitt et al. | 340/572.7 |
| 6,901,304 B2 * | 5/2005 | Swan et al. | 700/115 |
| 6,935,560 B2 * | 8/2005 | Andreasson et al. | 235/385 |
| 6,943,478 B2 | 9/2005 | Zepp et al. | |
| 6,943,678 B2 * | 9/2005 | Muirhead | 340/505 |
| 6,988,079 B1 * | 1/2006 | Or-Bach et al. | 705/28 |
| 7,227,469 B2 * | 6/2007 | Varner et al. | 340/572.1 |
| 7,258,276 B2 * | 8/2007 | Linton et al. | 235/385 |
| 7,277,015 B1 * | 10/2007 | Morhard et al. | 340/572.1 |
| 7,287,694 B2 * | 10/2007 | Banavar et al. | 235/383 |
| 7,357,298 B2 * | 4/2008 | Pokorny et al. | 235/375 |
| 2001/0049690 A1 | 12/2001 | McConnell et al. | |
| 2002/0084889 A1 | 7/2002 | Bolavage et al. | |
| 2002/0183882 A1 | 12/2002 | Dearing et al. | |
| 2003/0233161 A1 | 12/2003 | Cheng et al. | |
| 2004/0098272 A1 * | 5/2004 | Kapsis et al. | 705/1 |
| 2004/0111335 A1 | 6/2004 | Black et al. | |
| 2005/0033619 A1 | 2/2005 | Barnes et al. | |
| 2005/0065861 A1 | 3/2005 | Bann | |
| 2005/0092825 A1 | 5/2005 | Cox, Jr. et al. | |

(Continued)

*Primary Examiner*—Travis R Hunnings
(74) *Attorney, Agent, or Firm*—Jordan IP Law, PC

(57) ABSTRACT

In an RFID system having an edge controller and a tag reader that is operably connected to the edge controller, a manifest of items having RFID tags tracked by the RFID system is identified, and data from the manifest is downloaded to the edge controller in anticipation of reading the RFID tags, i.e., the manifest data is prefetched. An RFID edge controller that may be operably connected to a tag reader receives, in anticipation of the tag reader reading RFID tags associated with items, manifest data prefetched from a database that stores manifests of items, and compares the manifest data with data read from the RFID tags to determine whether the items comply with the manifest.

1 Claim, 2 Drawing Sheets

U.S. PATENT DOCUMENTS

2005/0093698 A1 5/2005 Sakamoto et al.
2005/0097010 A1 5/2005 Carrender
2007/0067248 A1* 3/2007 Chatte .................. 705/401

* cited by examiner

PREFETCHING MANIFEST DATA IN AN RFID SYSTEM

This application is a continuation of U.S. patent application Ser. No. 11/244,362, filed on Oct. 5, 2005, now U.S. Pat. No. 7,432,797.

BACKGROUND OF THE INVENTION

The invention concerns radio frequency identification (RFID) systems, and more particularly concerns prefetching manifest data in anticipation of reading RFID tags.

As RFID tags become less expensive, they are increasingly being used to track items through production and distribution channels. For example, a shipment of items may be sent from a manufacturer to a warehouse, or from a warehouse to a retail outlet, where the items are tracked by RFID tags. When such a shipment arrives, it is validated. This entails reading each of the RFID tags, and comparing data read from the tags with data from a manifest that describes the expected contents of the shipment, in order to determine whether, for example, all of the expected items are accounted for, and that the items that arrive are indeed the items that were expected. In this way, a determination is made as to whether the items comply with the manifest.

In order to determine whether the items comply with the manifest, RFID tags associated with the items are read by an RFID tag reader. When a tag is read, the tag reader sends tag data up to an RFID edge controller, which may service a number of other tag readers as well. The edge controller then passes the data to a server, such as an RFID premises server, which has access to a database of manifests. The server compares the tag data with manifest data from the appropriate manifest, and reports the result of the comparison to the edge controller. If the item in question comports with the manifest, the edge controller so indicates, for example by audibly beeping or displaying a green light. This is repeated for each item of the shipment, thus to determine whether the shipment complies with the manifest.

Although this process works well on a small scale, large shipments of items require significant processing power and communication bandwidth. Moreover, since the edge controller and the server may service a number of different tag readers and process a number of different shipments of items simultaneously, resource constraints may emerge. For example, equipment buffers may fill and network delays may arise in the path between the edge controller and the server, thereby degrading responsiveness and limiting the effectiveness of this traditional approach as shipping traffic becomes more intense. Thus, there is a need for a more efficient way of determining whether items of a shipment tracked by RFID tags conform to an associated manifest.

SUMMARY

One aspect of the invention includes a method suitable for use in an RFID system having an edge controller and a tag reader that is operably connected to the edge controller. A manifest of items having RFID tags tracked by the RFID system is identified, and data from the manifest is fetched and downloaded to the edge controller in anticipation of reading the RFID tags, i.e., the manifest data is prefetched. Another aspect of the invention includes an RFID edge controller that may be operably connected to a tag reader. The edge controller receives, in anticipation of the tag reader reading RFID tags associated with items, manifest data prefetched from a database that stores manifests, and compares the manifest data with data read from the RFID tags to determine whether the items comply with the manifest.

BRIEF DESCRIPTION OF THE SEVERAL VIEWS OF THE DRAWINGS

The invention will be best understood by reading the following detailed description together with the drawings, wherein.

DETAILED DESCRIPTION

Figure 1:
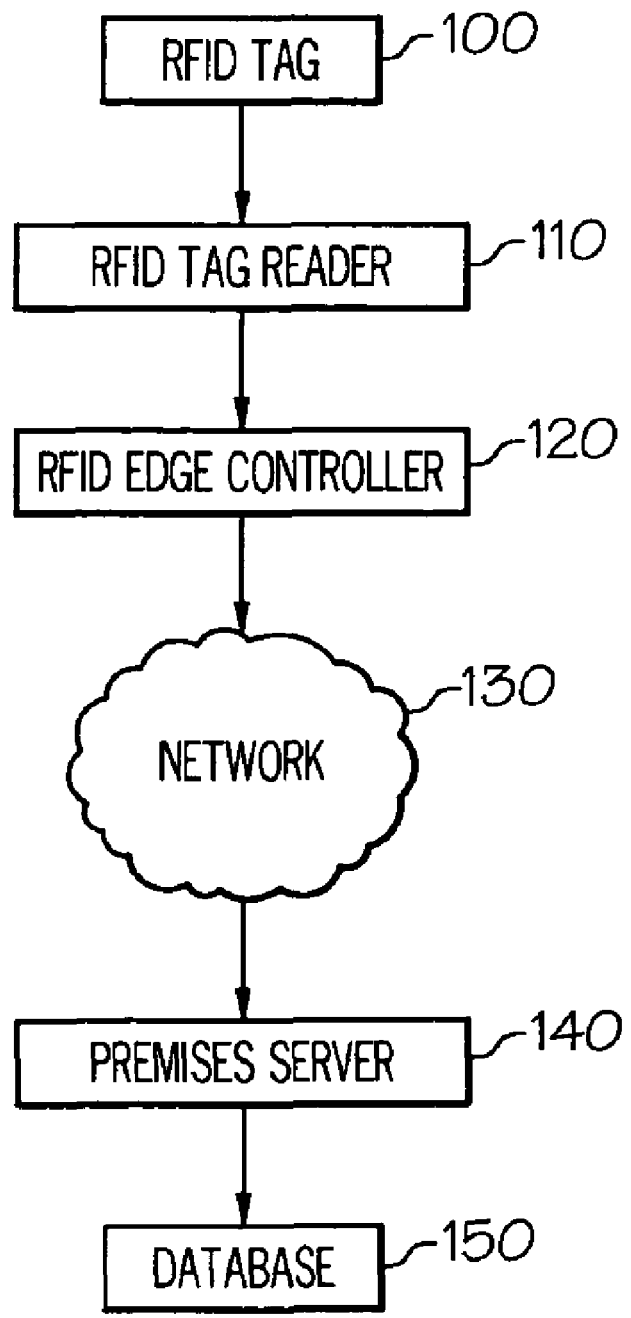
FIG. 1 is a block diagram that shows an exemplary RFID system.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code embodied in the medium. Any suitable computer-readable medium may be utilized, including hard disks, CD-ROMs, optical storage devices, magnetic storage devices, and transmission media such as those supporting the Internet or an intranet.

Computer program code for carrying out operations of the present invention may be written in an object oriented programming language such as Java, Smalltalk, or C++. However, the computer program code for carrying out operations of the present invention may also be written in conventional procedural programming languages, such as the C programming language. The program code may execute entirely on the user's computer, partly on the user's computer, as a stand-alone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to flowchart illustrations and/or block diagrams of methods, apparatus (systems), and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

FIG. 1 shows an exemplary RFID system. An RFID tag 100 may be read by an RFID tag reader 110. Although just one RFID tag is shown in FIG. 1, the RFID tag reader 110 may, of course, read more than one RFID tag. A conventional RFID tag 100 comprises a transceiver, a power converter, and an antenna. As is well known to those skilled in the art, a passive RFID tag receives electromagnetic energy through the tag antenna when read or queried by the tag reader 110. The power converter, which may be, for example, a rectifier and a simple filter such as a capacitor, transforms the received energy into a form suitable to power the transceiver, in order that the transceiver may respond to the tag reader. In contrast to passive RFID tags, active RFID tags may include an internal power source such as a small battery, which eliminates the need to power the transceiver from energy received by the tag antenna. The invention applies to both passive and active RFID tags. Since conventional RFID tags both passive and active are well known to those skilled in the art, no further elaboration will be given here.

The RFID tag reader 110 may be operably connected to an RFID edge controller 120. For example, the RFID edge controller 120 may include IBM WebSphere™ Embedded Software with IBM RFID Enablement. The RFID edge controller 120 may filter tag reads, apply some logical processing to the read tag data, and pass the tag data or information derived from the tag data to a premises server 140.

In FIG. 1, the RFID edge controller 120 and the premises server 140 are connected by a network 130. The network 130 may be, for example, the Internet, an intranet, or a local-area or wide-area network of any kind, including direct connection or operational integration. The use of a network is not, however, a necessary condition of the invention.

The premises server 140 may process tag data or other data received from the premises server 120, convert tag data, store and retrieve tag data and other data such as manifest data resident on a database 150, and exchange information with backend equipment such as a warehouse management system (not shown). An individual and distinct premises server such as premises server 140 shown in FIG. 1 is not a necessary element of the invention. For example, the functions of the premises server 140 may be otherwise distributed, and the RFID edge controller 120 may, for example, have read and/or write access to the database 150 more directly or through other apparatus not shown in FIG. 1.

Figure 2:
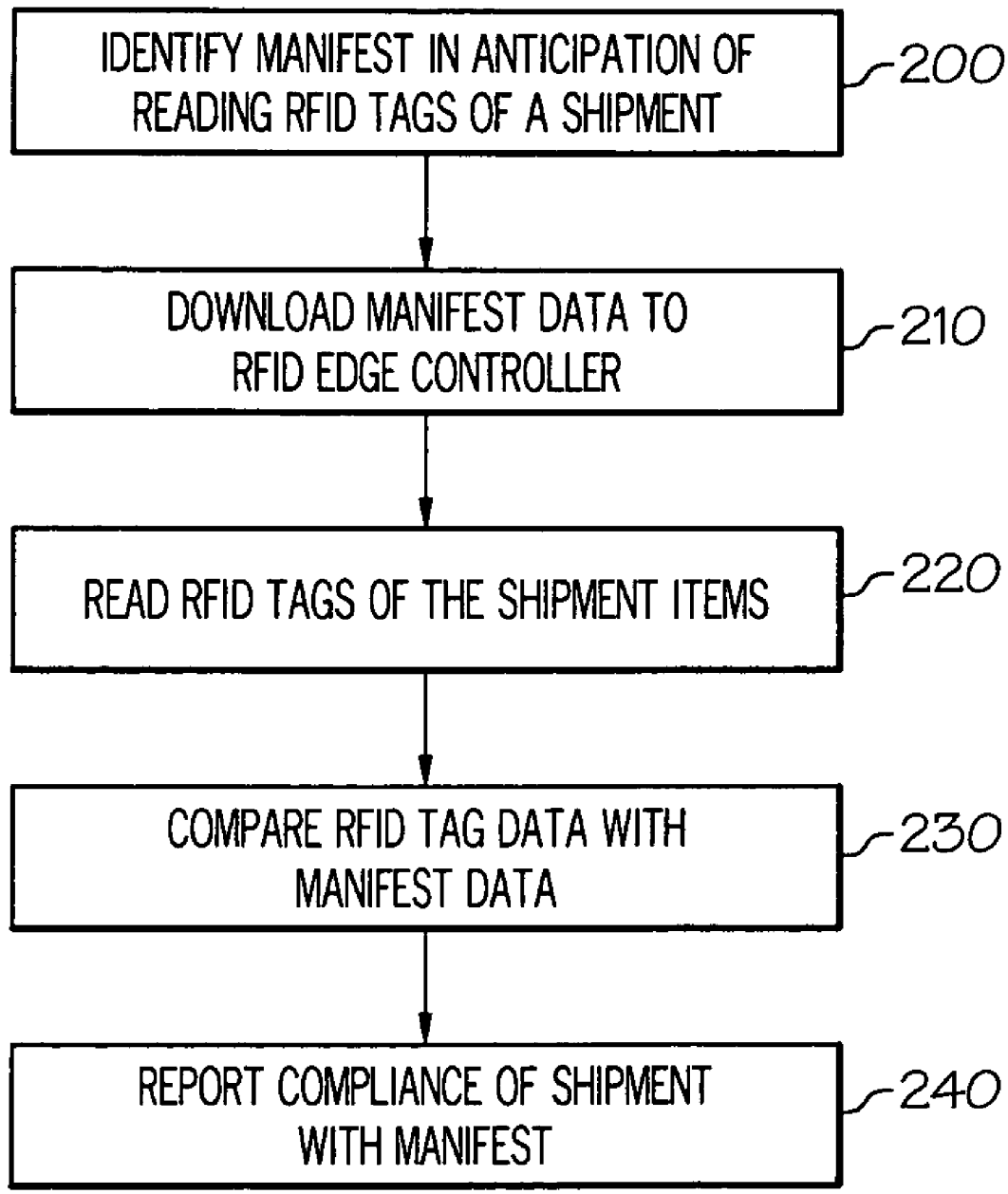
FIG. 2 is a flowchart that shows aspects of a method for processing RFID tag data.

FIG. 2 is a flowchart that shows aspects of a method for prefetching and processing RFID tag data, suitable for application in, for example, an RFID system of the kind just described with reference to FIG. 1.

As shown in FIG. 2, a manifest is identified in anticipation of the RFID tag reader 110 reading RFID tags (Block 200), and data from the manifest (manifest data) such as a list of valid RFID tag numbers is then downloaded to the RFID edge controller 120 (Block 210). Thus, the manifest data is prefetched with respect to reading the RFID tags. The manifest data may be read from the database 150, and passed through the premises server 140 to the RFID edge controller 120.

One purpose of prefetching and downloading the manifest data to the RFID edge controller 120 is to minimize the need for exchanges, item-by-item, between the RFID edge controller 120 and the database 150. In a preferred embodiment, the manifest data that is downloaded is batch data that pertains to a plurality of RFID tags rather than a single RFID tag. For example, manifest data concerning an entire shipment of items may be downloaded to the RFID edge controller 120 before any of the RFID tags associated with items of the shipment are read by the RFID tag reader 110.

A manifest may be identified in anticipation of reading the associated RFID tags in a number of ways. For example, a manifest may concern items of a shipment that arrives by truck at a loading dock. In this case, the manifest may be identified according to an identification number of the truck, for example its license plate number. An identification number of a container; or equivalently of a case, pallet, box, bundle, package, or the like; that bears the items of the shipment may be used in the same way.

In another embodiment, a manifest may be identified according to an expected shipment arrival time. For example, a shipment may be scheduled to arrive at 10:00 AM on Wednesday. In this example, the manifest for the 10:00 AM shipment would be identified and manifest data downloaded to the RFID edge controller 120 at or before 10:00 AM on Wednesday in anticipation of the arrival of the shipment, i.e., the manifest data would be prefetched. In another embodiment, a plurality of manifests may be sorted according to their expected arrival times, and manifest data prefetched according to relative expected shipment arrival times rather than absolute expected arrival times. For example, manifest data for a shipment expected to arrive at 11:00 AM on Wednesday may be downloaded shortly after the manifest data for the 10:00 AM expected arrival is downloaded, irrespective of the then-current time of day.

In yet another embodiment, a manifest may be identified according to an item of the manifest. For example, an RFID tag associated with one of the items of a shipment may be read by the RFID tag reader 110, and RFID tag data passed up to the premises server 140. The premises server 140 may then search the database 150, or cause the database 150 to be searched, in order to identify a manifest that concerns the item for which RFID tag data was read. Data from the identified manifest, which data concerns RFID tags of the shipment not yet read, may then be fetched and downloaded to the RFID edge controller 120 in anticipation of reading the other RFID tags of the shipment.

For each item of a shipment or other grouping, the associated RFID tag is read by the RFID tag reader 110 (block 220). The RFID tag reader 110 passes the tag data up to the RFID edge controller 120, which compares the tag data with the manifest data to determine whether the item comports with provisions of the manifest (Block 230). If all of the items of the shipment comport with the manifest, or if a substantial or predetermined number of the items comport with the manifest, the RFID edge controller 120 reports that the shipment complies with the manifest (Block 240). This report, along with other information concerning the shipment, may be sent from the RFID edge controller 120, through the RFID premises server 140, and on to the database 150 or on to a backend warehouse management system.

Although the foregoing has described methods, computer program products, and apparatus for prefetching manifest data in an RFID system, the description of the invention is illustrative rather than limiting, and the invention is limited only by the claims that follow.

We claim:

1. A computer program product suitable for use in an RFID system having an edge controller and a tag reader operably connected to the edge controller, said computer program product comprising a computer readable medium having computer readable program code embedded therein, the computer readable program code comprising:

computer readable program code configured to identify a manifest of items having RFID tags tracked by the RFID system and computer readable program code configured to download data from the manifest to the edge controller, in anticipation of reading the RFID tags by the tag reader, wherein the edge controller services at least a tag reader, and wherein the computer readable program code configured to identify a manifest comprises computer readable program code configured to identify a vehicle that transports items on the manifest to provide a vehicle identity, and to select a manifest from a plurality of manifests using the vehicle identity.

* * * * *